May 15, 1962     W. R. BORDER, JR     3,034,380
BORING BAR JIG WITH ANGLE GAUGE
Filed June 15, 1959     2 Sheets-Sheet 1
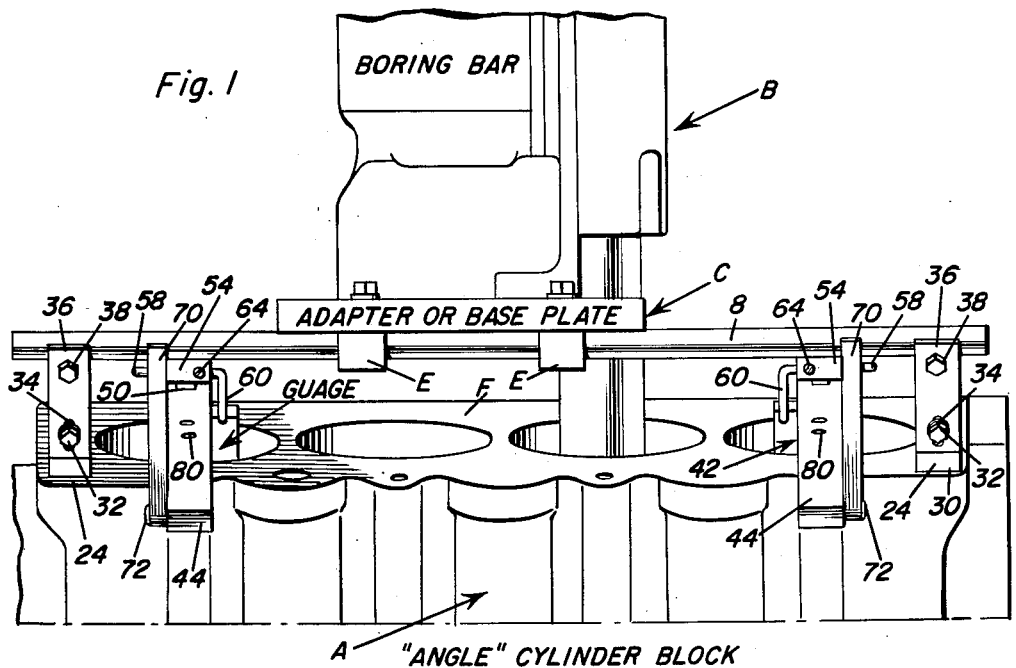
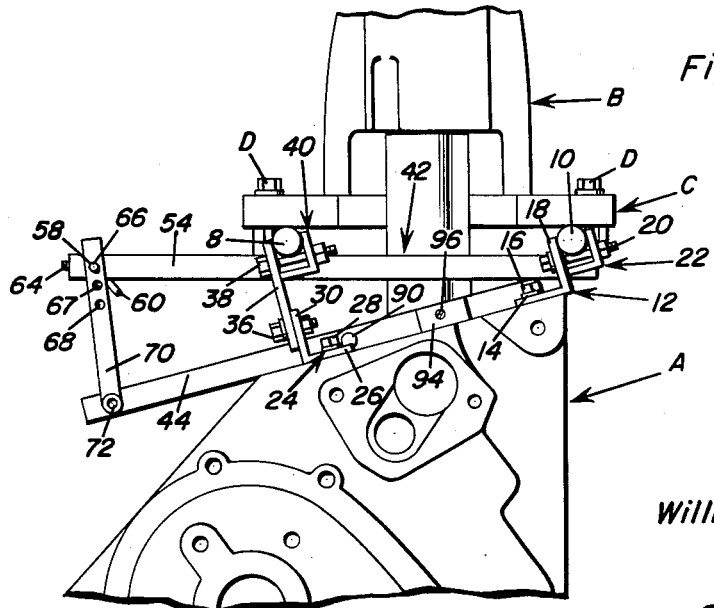
William R. Border, Jr.
INVENTOR.

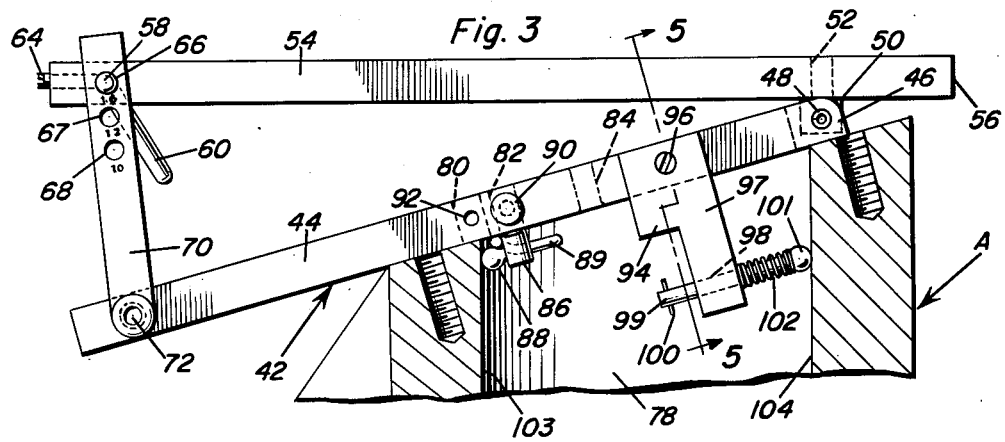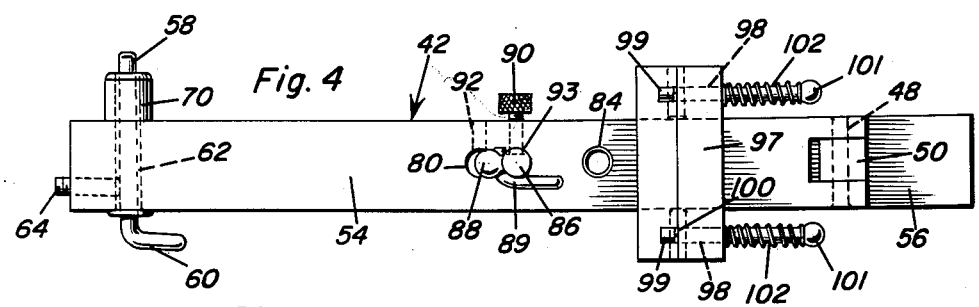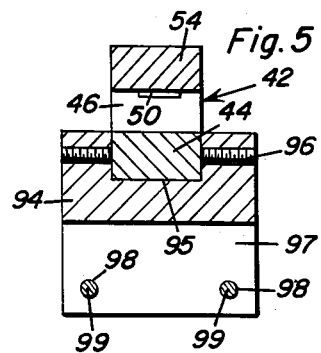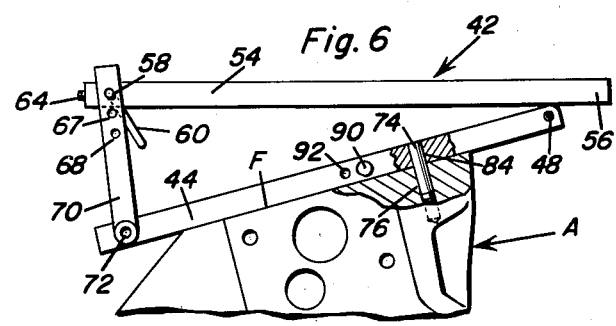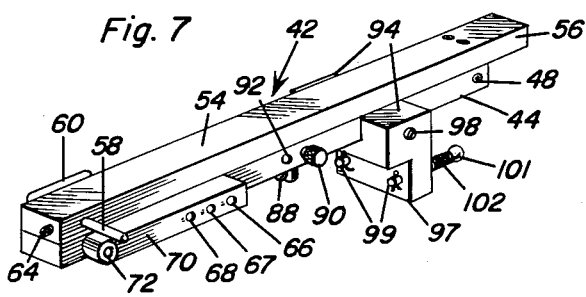
William R. Border, Jr.
INVENTOR.

United States Patent Office 3,034,380
Patented May 15, 1962

3,034,380
BORING BAR JIG WITH ANGLE GAUGE
William R. Border, Jr., Rte. 2, Box 356, Bedford, Pa.
Filed June 15, 1959, Ser. No. 820,419
7 Claims. (Cl. 77—2)

This invention relates to improved means by way of which an automobile mechanic may support and accurately align a boring bar and its base or adapter plate with the cylinder bores of an angle-type cylinder block, whatever the angle, insuring original cylinder alignment; and has to do, more particularly with a novel variable angle base plate mounting and adjusting jig and, what is also important, equally novel jig adjusting and setting gauges which are paired and expressly designed and constructed for reliable and accurate cooperation with the jig.

Persons conversant with the state of the art to which the present invention relates are, no doubt aware that numerous automobile engines, for example, Ford and Chevrolet V-8 engines are designed with the top of the cylinder block disposed or pitched at an angle relative to the axes of the cylinder bores. These bores cannot be accurately and acceptably rebored with a boring bar unless the mechanic resorts to the use of a properly and precisely engineered adapter plate or an equivalent base plate for the boring bar. Many and various angle riser plates and adapters have been offered for use by others working in this field. For example one riser plate is necessary for reboring all V-8 engine blocks used in the 1958 Mercury, 1958 Lincoln and Edsel and other models wherein the pitch or angle is 10°. A slightly larger plate (not shown) but which is basically the same in construction, may be required when the reboring job has to do with Ford trucks. A fundamentally similar but slightly different riser plate is required for reboring 1958 Chevrolet models with V-8 engines. Where the bore is of a prescribed measurement and the pitch or angle of the base plate of the boring bar may have to be made to serve at around 15 or 16 degrees. There are other riser requirements in between the usual 10 to 16 degree limits. Confronted with this problem your applicant found it expedient and practical to devise a specially constructed jig which, instead of being in the form of a one-piece casting or a corresponding construction or an equivalent structure, comprises a sectional or knock-down construction. As a matter of fact the jig which first came to my mind is of the construction and form disclosed in my co-pending application Serial No. 788,990 filed on January 26, 1959, now Patent No. 2,985,040. Briefly, reference to the co-pending application will bring to light novel means for use between the top of the cylinder block and the base portion of a boring bar characterized by an adapter plate on which the base of the bar is properly located and fastened while reboring a cylinder or cylinders. The knock-down riser means is such that it is adapted to be interposed between the top cylinder block and the adapter plate. This means embodies a pair of generally horizontal spaced parallel track rails and means for securing the rails to the cylinder block, the adapter plate having clips or other means thereon whereby it may be removably shiftably and adjustably mounted for support on the track rails.

In carrying out the principles of the prior construction, copending, Serial No. 788,990, now Patent No. 2,985,040, elongated rods cylindrical in cross-section are employed to serve as the track rails. The means for anchoring the track rails comprises a first angle iron adapted to be removably anchored on top of the block, a second angle iron of corresponding construction adapted to be mounted in opposed parallelism to the first named angle iron. It has been found advisable to dispense with these elongated angle irons. Therefore, one phase of the instant concept has to do with the substitution for the angle irons of a suitable number of simple L-shaped anchoring brackets and L-shaped clamping clips. Each rod, instead of being bolted, with the bolts cooperating with the notched out portions of the rod is improved here in that there are no bolt holes or notches in the rods themselves. In other words, the present invention features a solid or an equivalent track or rail rod which has its end portions cradled or seated in L-shaped clips with the clips frictionally clamping the rod-ends in place.

It follows that novelty in the instant improvement pertains to a knockdown-type jig properly prefabricated for adjustably and detachably supporting a boring bar base plate or adapter plate comprising a first pair of upstanding longitudinally spaced brackets adapted to be temporarily anchored atop the cylinder block on one longitudinal side of the block, a clamping clip bolted on each bracket, a first horizontal track rail spaced above the top of the block and having its respective end portions clamped by said clips to said brackets, a second pair of brackets like the brackets of the first pair and likewise longitudinally spaced and temporarily anchored on said block at the other longitudinal side of the block, cleats bolted on the second brackets and rising vertically therefrom and having clamping clips adjustably mounted on their upper ends, and a second horizontal track rail also like the first rail but having its end portions mounted and removably held in place by way of the last named clamping clips and complemental upper end portions of their respective cleats.

Another aspect of the pending construction has to do with a pair of spaced parallel rails, means for removably and adjustably mounting the rails in an elevated position above the top of the cylinder block, a pair of spaced parallel straight edges resting simultaneously atop the rails means for removably joining the straightedges to the rails so that the straightedges may be applied and removed at will. Then, too, gauge blocks are employed and these are adapted to be interposed between the median underneath portions of the straightedges while occupying a position in the space between the guide rails, the gauge blocks having inclined upper surfaces for cooperation with the coacting portions of the straightedges. It has been concluded at this date of experimentation to set aside the previously proposed use of the above named gauge blocks. In fact, trial and error endeavors have suggested the substitution for the "blocks" of novel insertable and removable twin leg angle gauges. It is evident therefore that another aspect of the instant disclosure pertains to a pair of spaced parallel track rails embodied in a boring bar base plate mounting jig; a readily insertable and removable angle determining and establishing gauge for the rails comprising upper and lower legs which are linearly straight and having like ends hingedly joined, the lower leg being adapted to extend transversely across and to rest atop an inclined top of an angle-type cylinder block with its end portions extending beyond and overhanging the edge portions of said block, means carried by said leg whereby it may be temporarily but accurately attached to the block, a link pivotally connected at a lower end to a free end of the lower leg, and means separably and adjustably connecting the upper end of said link to the free end of the upper leg.

Further novelty is predicated on the novel means which the angle gauges are provided with for centering and aligning the applied positions of the angle gauges in relation to the axes of the bores in the cylinder block. The specific devices utilized to achieve this result will be set forth in detail in the following specification and claims.

Other objects, features and advantages will become more readily apparent from the following description and the accompanying illustrative, but not restrictive, drawings.

In the drawings, wherein like numerals are employed to designate like parts throughout the views:

FIG. 1 is an elevational view showing a fragmentary portion of an angle-type cylinder block, the boring bar, the adapter or base plate fastened to the bottom thereof and with the base plate shiftably mounted for operation on the spaced parallel properly adjusted rails of the improved base plate and boring bar jig.

FIG. 2 is an end view which gives a better idea of the construction and useful position of the angle gauges.

FIG. 3 is a view in section of a fragmentary portion of the angle block and which shows in greater detail one of the angle gauges and how it is constructed and used.

FIG. 4 is a bottom plan view of the gauge seen in FIG. 3.

FIG. 5 is an enlarged cross-section on the line 5—5 of FIG. 3, looking in the direction of the arrows.

FIG. 6 is a view on a smaller scale similar to FIG. 3 and showing approximately the same construction and arrangement but illustrating a different means on the lower leg of the gauge for anchoring the same on the inclined top of the block.

FIG. 7 is a perspective view of the angle gauge showing how the components embodied therein can be folded into compact and convenient relationship.

Reference will be made first to FIGS. 1 and 2 wherein it will be observed that the "angle" cylinder block is denoted by the reference character A, the boring bar at B and the adapter or base plate at C. The base plate (not detailed) is suitably bolted or otherwise attached to the bottom of the boring bar and is provided with bolts D and suitable clips E whereby the same may be removably mounted on the improved variable or adjustable jig which is interposed between the slanting top surface F and the base plate C.

The jig is quite simple and is characterized (FIG. 2) by a rod 8 at the left cooperating with a rod 10 at the right which rods constitute the tracks or rails and on which the base plate C is removably and shiftably mounted in the manner illustrated. It is repeated (in order to distinguish from the co-pending construction) that the rods 8 and 10 here are not bolted in place but are "clamped" as will be further revealed. In other words, there are no bolt holes or notches in these rods to weaken them.

A first pair of L-shaped brackets 12 is provided at the right in FIG. 2 and the horizontal portions 14 are bolted down on the block as at 16. The vertical portion 18 rises to accommodate a readily insertable and removable bolt 20 which serves to hold the companion L-shaped clamping clip 22 in place. By arranging the component portions of the clip 22 and bolting the same on 18 in the manner shown a seat or cradle is provided for the cooperating end portion of the rod and this construction provides a highly satisfactory means for mounting the rod or track in the desired adapter plate supporting position. The construction at the left is much the same but is described separately in that here again two or more L-shaped hold-down brackets 24 are provided and the horizontal portion 26 is bolted in place at 28 and the vertical portion 30 has a bolt hole to accommodate the bolt 32 which is connected with a slotted portion 34 of a substantially vertical cleat or equivalent connecting member 36 whose upper end accommodates a bolt 38 which is employed in the manner already described to hold in place the component parts of the L-shaped clamping clip 40. Here again the construction is such that a seat or cradle is provided for clamping the end of the rod 8 in place. The adjustable means 36 and the bolts 32 serve to permit adjustment which makes it possible to bring the two rods 8 and 10 into coplanar relationship for properly supporting the base plate C.

The angle gauges are the same in construction and preferably employ a pair of the same and utilize them as illustrated in FIGS. 1 and 2 by interposing the same between the rails 8 and 10 and the inclined top surface F of the cylinder block. The description of one gauge will do and the gauge is denoted as an entity by the numeral 42. It comprises a pair of legs the bottom one of which may be referred to as the lower leg 44. The furcations 46 at the bifurcated end at the right of FIG. 3 are hingedly or pivotally mounted at 48 on a block 50 carried, as at 52 by the right hand end portion of the upper leg 54. The hinge joint is to the left of the end portion 56 so that this portion projects beyond and overhangs the cylinder block. At the left hand end the arm or leg 54 is provided with an insertable and removable retaining pin 58 having a crank handle 60 at one end for convenient usage. The pin is mounted in a passage 62 therefor and is held in position by a setscrew 64 (FIG. 4). The projecting end portion of the pin 58 provides a retainer which is selectively cooperable with the holes 66, 67 and 68 in the upper portion of a spreading and holding link 70 and which holes are identified by the degree marks 10°, 13° and 16° respectively. The lower end of the link is suitably pivoted at 72 to the adjacent positioned end portion of the leg 44. It will be evident therefore that the level or position of this upper leg 54, which determines the proper leveling of the rods 8 and 10 is variable and can be obtained in an obvious manner by adjusting the link 70. When the link is not in use it is folded to the position shown in FIG. 7. Also the two legs 54 and 44 may be collapsed to provide a compact and convenient arrangement.

A simple means for fastening the lower leg atop the cylinder block is that shown in FIG. 6 which comprises a stud or a pin 74 fitting into an existing socket or bolt hole 76 in the cylinder block.

An alternate means for aligning the gauge with a bore, for example, the bore 78 in FIG. 3 is somewhat more elaborate but not complicated. It will be noticed first that there are several vertical stud holes 80, 82 and 84 provided to accommodate the insertable and removable stud 86. This stud has its lower end portion depending into the bore and provided with a wall contacting abutment or ball stop 88. The numeral 89 designates suitable handle for the stud 86. The portion of the stud may be fitted into any one of the selected holes 80, 82 or 84 and held in place by a clamping or setscrew 90. This screw may be threaded through one of the holes 92 provided therefor to engage a flattened side (FIG. 4) 92 of the stud. An attachable and detachable block 94 is provided and this has a notch therein as shown at 95 in FIG. 5 to accommodate the cooperating portion of the leg 44. The block is fastened in the desired or intended position by way of setscrews 96. The depending flange 97 thereof is provided with holes 98 to accommodate slidably mounted pins 99 held in place by cotter keys 100. Each pin is provided with a ball contact element 101 and the adjacent portion of the pin is surrounded by a coil spring 102 which spring serves to yieldingly press the ball head 101 on the pin against the wall of the bore 78. Thus one wall 103 serves to accommodate the relatively stationary contact ball 88 and the opposed wall 104 serves to accommodate the ball head 101. By inserting these devices 88 and 101 into the upper portion of the bore 78, the leg 44 of the gauge is properly held in position in a practical and highly satisfactory manner.

It will be clear that the utilization of the pair of angle gauges with a variable cylinder boring jig simplifies the method and means of applying the track rails to the varying angle blocks encountered and does away with the presently questionable gauge blocks referred to in the aforementioned co-pending application. The improved construction also permits simplification of the means for bracketing the rails to the cylinder block which means now allows the ready insertion and removal of the angle gauge. It is repeated that the cylindrical rods used as the track rails are of solid construction. The angle gauge is so designed that it is possible to make it accommodate almost any angle and suitable parallelism, the aforementioned pin 74 being removable from the hole provided therefor to allow the parts to be collapsed and folded as shown in FIG. 7. The spring loaded pins and ball members 88 and 101 make for practical use of the device different sizes or diameters of cylinders. The gauge is so constructed as to provide means of alignment on the top of the cylinder and also the cylinder bore to provide as accurate a method of aligning as is reasonably possible maintaining original cylinder bore relationship and alignment. Also by using these angle gauges in the manner shown and constructed they are located adjacent the end portions of the cylinder and are accessible and may be adjusted for accurately setting up the jig for the boring bar base plate.

It is believed that a careful consideration of the description, the statement of the objects and the accompanying drawings will enable the reader to obtain a clear and comprehensive idea of the invention and its features and advantages. Under the circumstances a more extended description is believed to be unnecessary.

Minor changes in shape, size, and materials as well as rearrangement of component parts may be resorted to in actual practice without departing from the spirit of the invention or the scope of the invention as claimed.

What is claimed as new is as follows:

1. A knockdown-type jig for adjustably and detachably supporting a boring bar base plate and constructed for use atop an angle-type cylinder block comprising a first pair of longitudinally spaced L-shaped brackets having horizontal portions adapted to be temporarily anchored atop the cylinder block on one longitudinal side of the block, a complemental L-shaped clamping clip for the upstanding portion of each bracket, said clip being opposed to and bolted on the upstanding portion and providing a receiving seat and clamp, a first track rod spanning the space between the brackets and having its end portion removably engaged in said seats and clamped in place by said L-shaped clips, a second pair of longitudinally spaced L-shaped brackets cooperable with the first named brackets and having horizontal portions adapted to be bolted atop the block and having upstanding portions, a cleat adjustably bolted to the upstanding portion of each of the second pair of L-shaped brackets, said cleat being provided at its upper portion with an L-shaped clamping clip, the cleat and clip together providing a cradle-like seat, and a second track rod parallel to said first track rod having its end portions engaged in said cradle-like seat.

2. For use between the top of an angled cylinder block and a boring bar; a base plate for operatively supporting and anchoring said boring bar above the cylinder block, an adjustable jig interposed between the bottom of the base plate and top of said cylinder block, said jig embodying a pair of spaced parallel track rails on which said base plate is shiftable and adjustably and removably mounted in a manner to permit the plate and boring bar to be shifted on the rails and selectively fastened thereon with the bar accurately aligned with a given bore in said block, and means for adjustably and detachably mounting the rails on said block in a manner permitting the rails to assume and stay put in position relative to each other and the inclined plane of the top of said block, said means embodying brackets which are adapted to be removably fastened atop the cylinder block, and clamping clips carried by the brackets, said rails having their end portions clamped solely by way of said clips to said brackets, and in combination, a pair of duplicate angle gauges adapted to rest atop the cylinder block and also adapted to cooperate with the jig, each gauge having an upper leg adapted to be positioned in a horizontal plane with its upper edge engaging lower edge portions of the rails for supporting the rails in a horizontal plane which forms an acute angle with said inclined plane.

3. A knockdown-type jig for adjustably and detachably supporting a boring bar base plate and constructed for use atop an angle-type cylinder block comprising a first pair of upstanding longitudinally spaced brackets adapted to be temporarily anchored atop the cylinder block on one longitudinal side of the block, a clamping clip bolted on each bracket, a first horizontal track rail spaced above the top of the block and having its respective end portions clamped by said clips to said brackets, a second pair of brackets like the brackets of the first pair and likewise longitudinally spaced and temporarily anchored on said block at the other longitudinal side of the block, cleats bolted on the second brackets and rising vertically therefrom and having clamping clips adjustably mounted on their upper ends, and a second horizontal track rail also like the first rail but having its end portions mounted and removably held in place by way of the last named clamping clips and complemental upper end portions of their respective cleats, and in combination a pair of angle gauges for cooperation with said jig, each gauge comprising linearly straight and otherwise suitably constructed legs having corresponding ends hingedly attached together, there being a lower leg to rest atop the cylinder block and an upper leg spanning the space between the rails and engaged beneath the underside portions thereof, said gauges being of a length greater than the width of the jig and the legs having free end portions and said free end portions being connected together by a pivotally mounted link, said link having one end adjustably connectible with the cooperating end of the upper leg.

4. A knockdown-type jig for adjustably and detachably supporting a boring bar base plate and constructed for use atop an angle-type cylinder block comprising a first pair of upstanding longitudinally spaced brackets adapted to be temporarily anchored atop the cylinder block on one longitudinal side of the block, a clamping clip bolted on each bracket, a first horizontal track rail spaced above the top of the block and having its respective end portions clamped by said clips to said brackets, a second pair of brackets like the brackets of the first pair and likewise longitudinally spaced and temporarily anchored on said block at the other longitudinal side of the block, cleats bolted on the second brackets and rising vertically therefrom and having clamping clips adjustably mounted on their upper ends, a second horizontal track rail also like the first rail but having its end portions mounted and removably held in place by way of the last named clamping clips and complemental upper end portions of their respective cleats, said brackets being L-shaped and provided with hold-down bolts, and said clips being also L-shaped and removably bolted to their respective cooperating parts.

5. For use in adjusting and setting the relative operating positions of a pair of spaced parallel track rails embodied in a boring bar base plate mounting jig, a readily insertable and removable angle determining and establishing gauge for the rails comprising upper and lower legs linearly straight and having ends which correspond hingedly joined, the lower leg being adapted to extend transversely across and to rest atop an inclined top of an angle-type cylinder block having at least one cylinder bore with a portion of the lower leg beyond and overhanging the edge portion of said block, means carried by said leg whereby it may be temporarily but accurately attached to the block, a link pivotally connected at a lower end to a free end of the lower leg, and means separately and adjustably connecting the upper end of said link to the free end of the upper leg, the means carried by the lower leg comprising at least one spring-loaded ball-equipped pin adapted to engage a wall of the bore and means for adjustably and detachably mounting the same on the lower leg, and a cooperating ball contacting element fixedly but adjustably joined with said lower leg.

6. For use in adjusting and setting the relative operating positions of a pair of spaced parallell track rails embodied in a boring bar base plate mounting jig, a readily insertable and removable angle determining and establishing gauge for the rails comprising upper and lower legs linearly straight and having ends which correspond hingedly joined, the lower leg being adapted to extend transversely across and to rest atop an inclined top of an angle type cylinder block having at least one cylinder bore with a portion of the lower leg extending beyond and overhanging the edge portion of said block, means carried by said leg whereby it may be temporarily but accurately attached to the block, a link pivotally connected at a lower end to a free end of the lower leg and means separably and adjustably connecting the upper end of said link to the free end of the upper leg, the means carried by the lower leg comprising spring-loaded ball-equipped pins, said balls adapted to engage a wall of the bore and means for adjustably and detachably mounting the pins on the lower leg, and a cooperating ball contacting element fixedly but adjustably joined with said lower leg by way of a stud, said stud being adjustably mounted in openings provided therefor on the lower leg and being insertable and removable.

7. A device as recited in claim 2 wherein each gauge has a projection fixed thereto extending downwardly therefrom for engaging the side wall of said bore and spring means carried by the gauge urging the projection into engagement with said bore.

References Cited in the file of this patent

UNITED STATES PATENTS

| | | |
|---|---|---|
| 1,669,194 | Froussard | May 8, 1928 |
| 2,266,113 | Wiss | Dec. 16, 1941 |
| 2,365,436 | Saucier | Dec. 19, 1944 |
| 2,373,341 | Rowe | Apr. 10, 1945 |
| 2,502,983 | Olsson | Apr. 4, 1950 |